US005795645A

United States Patent [19]

Takahashi et al.

[11] Patent Number: 5,795,645
[45] Date of Patent: Aug. 18, 1998

[54] MAGNETIC RECORDING MEDIUM

[75] Inventors: Masatoshi Takahashi; Nobuyoshi Asada; Hiroshi Hashimoto; Masashi Aonuma, all of Kanagawa, Japan

[73] Assignee: Fuji Photo Film Co., Ltd., Kanagawa, Japan

[21] Appl. No.: 617,555

[22] Filed: Mar. 19, 1996

[30] Foreign Application Priority Data

Mar. 31, 1995 [JP] Japan ................................. 7-097497

[51] Int. Cl.$^6$ ................................. G11B 5/702
[52] U.S. Cl. .................. 428/216; 428/323; 428/328; 428/425.9; 428/694 BU; 428/694 BL; 428/694 BA; 428/694 BG; 428/900
[58] Field of Search ..................... 428/323, 328, 428/425.9, 694 BU, 694 BL, 694 BA, 900, 694 BG, 216

[56] References Cited

U.S. PATENT DOCUMENTS

| | | | |
|---|---|---|---|
| 4,286,022 | 8/1981 | Vermillion et al. | 428/423.1 |
| 5,165,999 | 11/1992 | Ushimaru et al. | 428/425.9 |
| 5,451,464 | 9/1995 | Abe et al. | 428/425.9 |
| 5,527,603 | 6/1996 | Isobe et al. | 428/323 |
| 5,578,376 | 11/1996 | Hashimoto et al. | 428/425.9 |

FOREIGN PATENT DOCUMENTS

| | | | |
|---|---|---|---|
| 0435264 | 7/1991 | European Pat. Off. | |
| 6-36265 | 2/1994 | Japan | G11B 5/706 |
| 6-215360 | 8/1994 | Japan | G11B 5/706 |
| 7-282442 | 10/1995 | Japan | G11B 5/706 |

OTHER PUBLICATIONS

Patent Abstracts of Japan, vol. 18, No. 264 (P–1740), 19 May 1994.

*Primary Examiner*—Stevan A. Resan
*Attorney, Agent, or Firm*—Sughrue, Mion, Zinn, Macpeak & Seas, PLLC

[57] ABSTRACT

A magnetic recording medium is disclosed, comprising a magnetic layer comprising a ferromagnetic powder and a binder provided on one side of a non-magnetic support and a backing layer provided on another side of said non-magnetic support, wherein said ferromagnetic powder is a ferromagnetic metal powder comprising Fe as a main component Co and containing Y in an amount of from 1 to 5 atm-% based on the total weight of Fe and Co in said ferromagnetic metal powder, and said binder comprises a polyurethane mainly comprising a diol component composed of a polyether polyol and a polyester polyol and a polyisocyanate component.

29 Claims, No Drawings

MAGNETIC RECORDING MEDIUM

FIELD OF THE INVENTION

The present invention relates to a magnetic recording medium. Particularly, the present invention relates to a coating type magnetic recording medium which performs high density recording and reproduction of digital signal. More particularly, the present invention relates to a magnetic recording medium for high-definition television.

BACKGROUND OF THE INVENTION

Heretofore, a magnetic recording medium comprising a non-magnetic support and a magnetic layer having a ferromagnetic powder dispersed in a binder, provided on the non-magnetic support, has been widely used for magnetic recording and reproduction.

In general, when such the magnetic recording medium is used for video tape or the like, dropout occurs. This defect is attributed to phenomena occurring on the magnetic recording medium itself, e.g., scratching (i.e., scraping or scuff marks) of the magnetic layer during running or phenomena occurring external to the magnetic recording medium, e.g., attachment of dust to the magnetic layer.

In order to solve the former problems, some countermeasures have been taken. One of these countermeasures is to incorporate adhesives in the magnetic layer in an attempt to stabilize the running of tape. Another is to raise the glass transition temperature (Tg) of the binder to be incorporated in the magnetic layer, thereby enhancing the strength of the magnetic layer.

On the hand, the latter problem is mainly attributed to the chargeability of the magnetic recording medium. During its running or other movements, the tape is rubbed with itself or other substances to become charged with electricity. It is thought that the electric charge thus produced attracts dust or the like in the air. In order to inhibit this phenomenon, some countermeasures have been taken. One of these countermeasures is to incorporate carbon black or an electrically-conductive polymer in the magnetic layer, reducing the surface electric resistance (Rs) of the magnetic recording medium.

However, the foregoing prior art countermeasure to inhibit the scratching of the magnetic recording medium leaves something to be desired. Even with this countermeasure, dropout attributed to scuff marks during running still occurs. The foregoing prior art countermeasure to inhibit the attachment of dust or the like to the magnetic recording medium comprises the incorporation of an electrically-conductive substance such as carbon black in the magnetic layer to raise the electrical conductivity of the magnetic recording medium, causing the electric charge generated to escape. However, the single use of this countermeasure is not sufficient to inhibit electrification. Further, if the content of a filler such as carbon black is increased to further raise the electrical conductivity of the magnetic recording medium, it not only deteriorates the running properties of the tape but also reduces the packing density of the ferromagnetic powder, thereby impairing the recording and reproduction characteristics. The foregoing latter problem also occurs when abrasives are incorporated in the magnetic recording medium to secure the foregoing running stability.

A metal tape adapted for magnetic head, particularly for business use, slides along the magnetic head to produce friction heat of 100° C. or higher at highest, for a short period of time though. In particular, such the metal tape for business use slides at a high speed and thus is noteworthy in this connection. In this case, if the binder used has a low heat resistance, it is melted and fluidized on the surface of the magnetic layer, thereby deteriorating the durability of the metal tape.

In particular, as mentioned above, products for business use comprising a ferromagnetic metal powder are adapted for operation at a high rotational speed. Also, these tapes have a large surface area, a high length and a large sliding area. Thus, these tapes for business use attract more dusts. Further, these tapes for business use have higher requirements against dropout than products for consumer use. Products for business use which show any dropout are rejected.

In order to solve the foregoing problems, various attempts have been made to improve the properties of the binder for dispersing the ferromagnetic powder therein.

For example, JP-B-55-5170 (The term "JP-B" as used herein means an "examined Japanese patent publication") (hereinafter referred to as "Publication A") discloses that a combination of an epoxy group-containing vinyl chloride/vinyl acetate copolymer and a polyurethane provides improvements in dispersibility and storage stability.

JP-A-57-44227 (The term "JP-A" as used herein means an "unexamined published Japanese patent application") (hereinafter referred to as "Publication B") discloses that a vinyl chloride-vinyl acetate-vinyl alcohol copolymer (optionally free of vinyl acetate) containing a hydrophilic group such as $-SO_3M$, $-COOM$ and $-P(=O)(OM')$ provides improvements in dispersibility and durability.

JP-A-61-123017 (hereinafter referred to as "Publication C") discloses that a vinyl chloride resin containing from 0.1 to 3% by weight of an epoxy group and a metal sulfonate provides improvements in dispersibility and physical properties of coating film.

Further, JP-A-62-121922 (hereinafter referred to as "Publication D") discloses that a binder comprising a polyurethane of aromatic polyether/polyester polyol and vinyl chloride containing epoxy and $-SO_3M$ groups provides improvements in the compatibility with vinyl chloride and provides a magnetic recording medium which is excellent in heat resistance, moisture resistance, hydrolytic resistance and durability.

JP-A-3-201211 (hereinafter referred to as "Publication E") discloses that a polyurethane having a good blocking property between polyether polyurethane and polyester polyurethane provides improvements in dispersibility, hydrolytic resistance and adhesive property.

On the other hand, high density recording media for the next-generation purpose such as high-fidelity television and digital equipment must comprise an ultrasmooth magnetic layer comprising an extremely finely divided magnetic powder having a high saturation magnetization (σS) dispersed therein to an extremely high degree. Even such the high density recording media cannot be put into practical use unless provided with a high durability such that the ultrasmooth magnetic layer shows no deterioration of properties after repeated running.

In order to enhance the dispersibility of ferromagnetic powder, vinyl chloroacetate resins containing epoxy group or polar group as disclosed in Publications A to C have been developed as binders. In recent years, a vinyl chloride resin containing a polar group and an epoxy group in combination has been known as a binder which can provide the highest dispersibility. In order to provide the magnetic layer with durability, a polyurethane binder has been used in combination with a vinyl chloride resin. The polyurethane binder is a resin obtained by the polyaddition of a soft segment such as polyester polyol with a relatively hard aromatic diisocyanate. This resin is soft but exhibits a toughness due to hydrogen bond of urethane group. However, the polyester polyurethanes as disclosed in Publications A to C have a poor hydrolytic resistance. In an attempt to overcome these problems, the polyether polyurethanes disclosed in Publications D and E have been proposed.

The polyether polyurethane comprises PEG (polyethylene glycol), PPG (polypropylene glycol), PTMG (polytetramethylene glycol) or the like as a long-chain polyol raw material and exhibits an excellent hydrolytic resistance. However, the polyether polyurethane has a disadvantage in that it has a low heat distortion temperature (Tg) and a low dynamic strength. The object of Publication E is to improve only the hydrolytic resistance of polyurethane. The single use of this polyether polyurethane cannot satisfy all the requirements for magnetic recording medium. Thus, this polyether polyurethane cannot be used.

Publication D concerns a polyurethane using a long-chain diol obtained by the esterification of a polyether polyol with an aromatic dicarboxylic acid for improving heat resistance and Tg of polyether polyurethane. The polyether moiety of the polyurethane has a good blocking property while the polyester moiety of the polyurethane doesn't have the property. This approach improves the heat resistance and Tg of the magnetic recording medium but has disadvantage in that it reduces the elongation at break of the magnetic recording medium and embrittles the magnetic recording medium. Thus, this approach cannot provide the magnetic recording medium with good durability and hence is practically insufficient. In some detail, since the magnetic layer becomes brittle, it falls off the edge of the tape during the operation of VTR. The resulting powder causes DO (dropout). Further, such the magnetic layer is subject to crack at the edge of the tape when the tape is slit. The resulting powder causes DO.

In other words, a binder which can solve these problems has been desired.

In order to avoid self-demagnetization loss during recording and thickness loss during reproduction, an extremely thin magnetic recording medium has been proposed.

For example, JP-A-6-215360 discloses that a magnetic recording medium comprising a ferromagnetic metal powder containing Fe atom, Al atom and rare earth elements that prevents roughened surface of the magnetic layer to be a digital recording medium having good electromagnetic characteristics and running durability.

Further, JP-A-6-139553 discloses a magnetic recording medium comprising a ferromagnetic metal powder mainly composed of α-Fe having a coercive force (Hc) of from 1,620 Oe to 2,100 Oe, a saturation magnetization of from 120 to 160 emu/g, a specific surface area of from 48 to 65 m²/g as determined by $N_2$ gas adsorption method, a long axis length of from 0.08 to 0.21 µm, a short axis length of from 10 to 20 nm, an acicular ratio of from 7 to 11 and a crystallite size of from 110 to 170 Å and discloses that this magnetic recording medium exhibits good electromagnetic characteristics and thus provides a magnetic recording medium which can give a high output of short wavelength of not more than 1 µm.

Further, JP-A-6-36265 discloses a magnetic recording medium comprising a ferromagnetic metal powder mainly composed of iron containing Al and/or Si and rare earth elements, the content of Al and/or Si being from 0.5 to 5.0% by weight based on Fe and the content of the rare earth elements being from 1 to 10% by weight based on Fe, and discloses that this magnetic recording medium is excellent in reversed magnetic field distribution (SFD) and thus provides a magnetic recording medium having excellent electromagnetic characteristics.

On the other hand, one of inventions which have been worked out in an attempt to attain the foregoing objects by specifying the shape of ferromagnetic metal powder and the magnetic properties of magnetic layer is JP-A-4-330623. The patent discloses a magnetic recording medium comprising a magnetic layer having a multi-layered structure, wherein the outermost magnetic layer has a coercive force of from 1,700 to 2,200 Oe and a saturation magnetic flux density of from 3,000 to 4,500 G, the ferromagnetic metal powder incorporated in the outermost magnetic layer has an average long axis length of not more than 0.25 µm and a crystallite size of not more than 200 Å, and the magnetic powder incorporated in the magnetic layers other than the outermost layer is iron oxide having a crystallite size of not more than 350 Å, and discloses that this magnetic recording medium provides a magnetic recording medium which exhibits high electromagnetic characteristics, causes little dropout and shows an excellent running durability.

Among the foregoing magnetic recording media for digital recording comprising a ferromagnetic metal powder, those adapted for broadcasting use, particularly for high-fidelity television, have been particularly desired to undergo development. Such the magnetic recording medium must comprise a finer ferromagnetic metal powder packed therein with a higher packing density and have an ultrasmooth surface. At the same time, such the magnetic recording medium must perform writing and reading at a shorter speed. To this end, enhancement has been made on the rotational speed of the cylinder and the carrying speed of the magnetic tape.

In particular, when the magnetic head and the magnetic recording medium make sliding movement at a high speed such that the speed of the magnetic recording medium relative to the magnetic tape is 21 m/sec, the abrasion of the magnetic head tends to increase. The magnetic recording medium must keep the abrasion of the magnetic head in an optimum range. At the same time, the magnetic recording medium must properly maintain the mechanical strength of the magnetic layer to exhibit a sufficient running durability free from scratching of the magnetic layer resulting in clogging of the magnetic head.

However, no methods have been found for obtaining a magnetic recording medium, particularly for high-fidelity television, which exhibits good electromagnetic characteristics and the foregoing running durability and secures a proper head abrasion.

SUMMARY OF THE INVENTION

An object of the present invention is to provide a magnetic recording medium, particularly for high-fidelity television, which keeps the abrasion of the magnetic head in an optimum range, maintains the mechanical strength of the magnetic layer so properly that it shows a good running durability free from scratching of the magnetic layer resulting in clogging of the magnetic head, and exhibits good electromagnetic characteristics.

The foregoing object of the present invention can be accomplished with a magnetic recording medium comprising a magnetic layer comprising a ferromagnetic powder and a binder provided on one side of a non-magnetic support and a backing layer provided on another side of said non-magnetic support, wherein said ferromagnetic powder is a ferromagnetic metal powder comprising Fe as a main component and Co and containing Y in an amount of from 1 to 5 atm-% based on the total of Fe and Co in said ferromagnetic metal powder, and said binder comprises a polyurethane mainly comprising a diol component composed of a polyether polyol and a polyester polyol and a polyisocyanate component.

In the present invention, it has been found that a magnetic recording medium, particularly for high-fidelity television, which keeps the abrasion of the magnetic head in an optimum range, maintains the mechanical strength of the magnetic layer so properly that it shows a good running durability free from scratching of the magnetic layer resulting in clogging of the magnetic head, and exhibits good electromagnetic characteristics can be prepared by restricting the polyurethane and the various elements of the ferromagnetic metal powder to a specific structure and using them in combination.

Heretofore, for obtaining a ferromagnetic metal powder having inherent high electrostatic properties (σs, Hc), a ferromagnetic metal powder can hardly be dispersed in a binder. Further, the resulting magnetic coating solution coagulates and thus cannot maintain a sufficient dispersion stability. Thus, the ferromagnetic metal powder cannot exhibit the inherent high magnetic properties. However, by combination of the present invention, the adsorption capacity to the ferromagnetic metal powder of the polyurethane is increased, and improvement of dispersibility and prevention of coagulation are achieved. Thus, the ferromagnetic metal powder having its inherent high magnetic properties can be obtained. As a result, the magnetic coating solution can exhibit a low viscosity at a high shearing speed to provide an excellent coating suitability that gives an extremely smooth coating surface. At the same time, the abrasion of the magnetic head can be inhibited by restricting the ferromagnetic metal powder to a specific composition.

Further, the present invention also provides a high running durability, i.e., reduction of clogging and elimination of scratching. This is probably because that the enhanced adsorption increases the interfacial force between the magnetic material and the binder and the binder has a high dynamic force, and thereby drastically enhancing the running durability. In particular, the use of a resin having a high Tg can be commonly considered to enhance the dynamic strength of the binder. However, when such the resin having a high Tg is used, the magnetic layer can hardly be smoothened by calendering, making it impossible to obtain high electromagnetic characteristics. Despite of its high Tg, the polyurethane resin of the present invention has polyether moieties in a block pattern and thus exhibits an excellent fluidity. Thus, the polyurethane resin of the present invention can easily become fluidized upon the smoothening process to provide the magnetic layer with a smooth surface that gives high electromagnetic characteristics. Eventually, a high density magnetic recording medium which can fully exhibit high magnetic properties inherent to the ferromagnetic metal powder can be provided. The present invention can provide a magnetic recording medium which exhibits excellent electromagnetic properties, excellent repeated running properties and a good preservability in the form of tape and produces little dropout.

Further, the effect of the present invention can be further enhanced by adding to the polyurethane resin of the present invention an existing resin, preferably vinyl chloride resins or the like.

The polyurethane resin of the present invention is a polyurethane resin in which the disadvantages of the prior art are improved. In some detail, the polyurethane resin of the present invention improves the heat resistance and Tg of the polyether polyurethane, maintains the high elongation at break of the polyether polyurethane and drastically enhances the foregoing durability. Thus, the foregoing defects of the polyether polyurethane can be overcome. As a result, a resin which can be practically used as a binder for magnetic recording medium can be provided.

Referring further to the difference in the structure, Publication E discloses that polyether polyurethane and polyester polyurethane are bonded via diisocyanate to produce polyurethane. On the other hand, the polyurethane of the present invention is a polyurethane having a polyether moiety and a polyester moiety both of which have a blocking property. In some detail, the polyurethane of the present invention is made of a polyether polyol component having a low Tg and a polyester polyol component having a high Tg. The polyether polyol having a low Tg and the polyester polyol having a high Tg have a low compatibility with each other. Even in the form of polyurethane, the resin undergoes microphase separation into a soft stretchable phase having a low Tg and a hard phase having a high Tg in the coating film. This microphase separation can be confirmed by the examination of the temperature dependence of the dynamic viscoelasticity, which shows two peaks of loss elastic modulus (E") or tanδ reflecting the glass transition. Thus, the hard phase can maintain the desired heat resistance and strength while the soft phase can give a great elongation. The polyurethane resin comprising a soft polyether segment and a hard segment incorporated in a long-chain polyol in admixture as disclosed in Publication D has an almost homogeneous phase that gives physical properties, i.e., hardness, Tg and elongation, intermediate between those of the soft segment and the hard segment. In other words, the higher Tg of the resulting resin is, the more brittle is the resin, and the more difficult is made it to attain the desired hardness, high Tg and great elongation at the same time. Therefore, the resin as disclosed in Publication D has an insufficient durability when used as a binder. The present invention provides drastic enhancement in durability.

These characteristic properties can provide improvements in running durability (particularly running durability, in a magnetic recording system, of high-fidelity VTR or digital VTR, in which the rotary video head rotates at a higher speed (3,600 rpm, 5,400 rpm, 7,200 rpm, 9,000 rpm, or more) than VHS or 8-mm VTR (1,800 rpm) to improve the magnetic recording density).

On the other hand, improvements were also made on the ferromagnetic metal powder to enhance the magnetic recording density and inhibit the abrasion of the magnetic head. In some detail, in the process of reducing the grain size, Co, which is a ferromagnetic metal, was added to Fe to enhance the coercive force and magnetic flux density of the ferromagnetic metal powder, and the content of Y was defined to from 1 to 5 atm-%, preferably from 1.4, to 4.0 atm-% based on the total content of Fe and Co. In general, a ferromagnetic metal powder exhibits a low affinity with a binder and thus shows a strong tendency to deteriorate the durability of the medium. Thus, the appearance of a good binder which can secure the durability of the medium has been desired. A magnetic recording medium which exhibits a high magnetic recording density and a drastically improved durability can be realized only when the binder of the present invention and the foregoing ferromagnetic-metal powder are combined. In particular, it is thought that a ferromagnetic metal powder exhibits an increased adsorptivity with urethane when it comprises Co incorporated therein and causes a reduced head abrasion when it comprises Y incorporated therein in a predetermined amount.

In the present invention, the content of Co in the ferromagnetic metal powder is normally from 5 to 40 atm-%, preferably from 10 to 30 atm-% based on Fe.

In general, when Tg of polyurethane is raised, it causes the following troubles: (1) Smoothening by calendering is made difficult; and (2) The curability of the resin is deteriorated. The polyurethane resin of the present invention has a polyether block moiety as a fluidized phase and thus shows neither deterioration of calenderability nor deterioration of curability. With these advantages, too, a magnetic recording medium which exhibits high electromagnetic characteristics and a good durability can be obtained. The curability of the binder can be further enhanced by increasing the content of branched OH groups.

The dispersibility of the ferromagnetic metal powder is very good because Co incorporated therein makes the powder more adsorptive to the binder. The dispersibility of the ferromagnetic metal powder can be further enhanced by incorporating at least one polar group selected from the group consisting of $-SO_3M$, $-OSO_3M$, $-COOM$, $-PO_3M_2$, $-OPO_3M_2$, $-NR_2$, $-N^+R_3X^-$, $-N^+R_2R^1SO_3^-$ and $-N^+R_2R^1COO^-$ (in which M represents a hydrogen atom, an alkaline metal ion selected from $Li^+$, $K^+$ and $Na^+$ or an ammonium ion; R and $R^1$ each represent an alkyl group having 1 to 12 carbon atoms; and X represents a halogen atom) in an amount of from $1\times10^{-6}$ to $1\times10^{-6}$ eq/g, preferably $1\times10^{-5}$ to $5\times10^{-4}$ eq/g.

The combination of the polyurethane resin and the ferromagnetic metal powder of the present invention can improve the running durability and inhibit the abrasion of the magnetic head.

The foregoing two elements will be further described hereinafter.

Firstly, the polyurethane will be described.

In the present invention, the polyurethane is contained in the binder in an amount of preferably 10 to 90% by weight (more preferably 20 to 70% by weight).

The polyurethane to be used in the present invention is mainly composed of a diol component comprising polyether polyol and polyester polyol and a polyisocyanate component.

Examples of the polyether polyol structure include PPG (polypropylene glycol), PTMG (polytetramethylene glycol), PEG (polyethylene glycol), addition product of BPA (bisphenol A) with PO (propylene oxide) and/or EO (ethylene oxide), and a compound having a mixture thereof as a basic composition. Preferred among these structures are PPG and PTMG.

Tg of the polyether polyol is normally not higher than 0° C., preferably from –60° to –10° C. The molecular weight of the polyether polyol is normally from 400 to 10,000, preferably from 500 to 5,000, more preferably from 800 to 3,000.

The proportion of polyether polyol in polyurethane is normally from 3 to 80% by weight, preferably from 5 to 70% by weight, more preferably from 10 to 50% by weight. If the proportion of polyether polyol is too small, the resulting effect is too low. On the contrary, if the proportion of polyether polyol is too great, the dynamic strength of the resin is reduced, lowering the durability of the medium.

The polyester polyol structure preferably contains a monomer having a cyclic structure (aromatic, alicyclic) and a monomer having a branched structure. Specific examples of the acid component include isophthalic acid (IPA), and terephthalic acid. Specific examples of the alcohol component include neopentyl glycol (NPG), cyclohexanedimethanol (CHM), cyclohexanediol, bisphenol A, and hydrogenated bisphenol A. The molecular weight of the polyester polyol is normally from 400 to 10,000, preferably from 500 to 5,000, more preferably from 800 to 3,000.

The proportion of polyester polyol in polyurethane is preferably from 5 to 92% by weight, more preferably from 20 to 70% by weight. If the proportion of polyester polyol is too small, the Tg of polyurethane is decreased. On the contrary, if the proportion of polyester polyol is too great, the polyurethane becomes hard and brittle, which is not preferable for durability of the magnetic layer.

The polyurethane of the present invention has at least two Tg's, one being normally from –250° C. to 0° C., preferably from –200° C. to 10° C., and the other being normally from 40° C. to 130° C., preferably from 45° C. to 110° C. If there are two Tg's, the lower Tg is preferably not higher than –5° C., more preferably from –10° C. to –40° C. while the higher Tg is preferably from 50° C. to 120° C., more preferably from 60° C. to 100° C. If there are three or more Tg's, two different polyester polyol components and one polyether polyol component may be used. Alternatively, one polyester polyol component and two different polyether polyol component may be used. If there are four or more Tg's, the same procedure can be followed.

In order to determine Tg of the polyurethane of the present invention, the resin is formed into a 20-μm thick film. The peak of E" of the film is measured by Vibron (manufactured by Orientec Co., Ltd.) to determine Tg thereof.

The polyurethane of the present invention preferably comprises at least one polar group selected from the group consisting of $SO_3M$, $PO_3M_2$ and $COOM$ (in which M represents a metal or ammonium) in an amount of from $1\times10^{-5}$ to $5\times10^{-4}$ eq/g.

As the polyisocyanate component to be incorporated in the polyurethane of the present invention there may be preferably used an aromatic or alicyclic diisocyanate such as TDI, MDI, IPDI and hydrogenated MDI.

The polyurethane of the present invention may comprise a low molecular polyol component such as known chain extender in addition to the foregoing diol component. In some detail, a diol such as NPG, ethylene glycol, 1,4-butanediol and dihydroxyethyl ether of bisphenol A, a trifunctional or higher alcohol such as trimethylolpropane, etc. may be used in combination to form a polyurethane having a branched structure.

These components (i.e., polyisocyanate and polyol) may be incorporated in the polyurethane in an amount of from 0 to 40% by weight.

The weight-average molecular weight of the polyurethane of the present invention is normally from 20,000 to 200,000, preferably from 30,000 to 100,000.

The polyurethane of the present invention exhibits a yield stress of normally not less than 2 Kg/mm$^2$, preferably from 2.8 to 8 Kg/mm$^2$, and an elongation at break of normally not less than 100%, preferably from 200 to 800%. The breaking stress of the polyurethane of the present invention is normally from 1 to 15 Kg/cm$^2$, preferably from 2 to 10 Kg/cm$^2$.

The introduction of the foregoing polar group into the polyurethane of the present invention is preferably accomplished by the use of DEIS described later or a polar group-containing aromatic polyol such as $SO_3Na$ group-containing polyester polyol comprising 5-sodium-sulfo-isophthalic acid, isophthalic acid, ethylene glycol and neopentyl glycol in combination with the diol component and polyisocyanate component of the present invention.

The binder of the present invention may normally comprise a known binder resin incorporated therein in an amount of from 0 to 90% by weight based on the total weight of the binder so far as it is useful in the accomplishment of the objects of the present invention or it doesn't give any adverse effects on the accomplishment of the objects of the present invention. Preferred examples of such the known resin include vinyl chloride resins, cellulose resins (e.g., nitrocellulose, cellulose acetate propionate), polyvinyl alkyral resin (e.g., polyvinyl acetal, polyvinyl butyral), phenoxy resin, and polyester resin. Particularly preferred among these resins are vinyl chloride resins.

The weight proportion of vinyl chloride (monomer) in the vinyl chloride resins is normally from 80 to 95% by weight. If the vinyl chloride content is too small, the resulting vinyl chloride resin has a reduced strength, lowering the durability of the medium.

The polymerization degree of the vinyl chloride resin is preferably from 200 to 1,000, more preferably from 250 to 500.

The polar group to be incorporated in the vinyl chloride resin is not specifically limited. Preferred examples of the polar group include —OH, —COOM, —$SO_3M$, —$OSO_3M$, —$PO(OM)_2$, —$OPO(OM)_2$, tertiary amine, quaternary ammonium salt, and epoxy group. Particularly preferred among these polar groups are —OH, —$SO_3M$, —$OSO_3M$, —$PO(OM)_2$, —$OPO(OM)_2$, and epoxy group. M represents an alkaline metal or ammonium.

The content of the polar group is preferably from $1\times10^{-6}$ to $1\times10^{-3}$ eq/g. If the content of the polar group exceeds this range, the viscosity of the resulting vinyl chloride resin is easily increased and thereby the dispersibility is easily reduced. If the content of the polar group falls below this range, the dispersibility of the resulting resin is easily reduced.

The amount of the epoxy group to be incorporated in the vinyl chloride resin is preferably from $1\times10^{-4}$ to $1\times10^{-2}$ eq/g, more preferably from $5\times10^{-4}$ to $2\times10^{-3}$ eq/g.

The introduction of OH group into the vinyl chloride resin is advantageous in that the OH group thus introduced reacts with an isocyanate hardener to form a crosslinked structure that enhances the dynamic strength of the vinyl chloride resin. The introduction of OH group into the vinyl chloride resin is preferably accomplished by bonding OH group to the main chain via hydrocarbon chain or polyalkylene glycol chain rather than by directing bonding OH group to the main chain as in vinyl alcohol. The resulting vinyl chloride resin advantageously exhibits a high curability. The OH group is preferably primary or secondary. The introduction of OH group into the vinyl chloride resin can be accomplished by the copolymerization of a vinyl monomer such as 2-hydroxypropyl (meth)acrylate, 3-hydroxypropyl (meth)acrylate, 4-hydroxybutyl (meth)acrylate and 4-hydroxybutyl allyl ether.

The content of OH group in the vinyl chloride resin is preferably from $1\times10^{-4}$ to $5\times10^{-3}$ eq/g, more preferably from $2\times10^{-4}$ to $2\times10^{-3}$ eq/g.

The vinyl chloride resin may preferably comprise other copolymerizable monomers in an amount of from 5 to 20% by weight. Examples of these copolymerizable monomers include (meth)acrylic acid alkylester, carboxylic acid, vinylester, allylether, styrene, glycidyl (meth)acrylate, 3-hydroxypropyl methacrylate, 2-hydroxypropyl methacrylate, 3-hydroxypropyl allyl ether, vinyl acetate, and other vinyl monomers.

The ferromagnetic metal powder to be used in the present invention will be further described hereinafter.

The ferromagnetic metal powder to be used in the present invention normally has a crystallite size of from 120 to 220 Å, preferably from 130 to 180 Å and a specific surface area ($S_{BET}$) of from 30 to 70 m²/g, preferably from 50 to 65 m²/g.

The saturation magnetization ($\sigma_s$) of the ferromagnetic metal powder is normally from 120 to 180 emu/g, preferably from 130 to 160 emu/g. The coercive force of the ferromagnetic metal powder is normally from 1,200 to 2,500 Oe, preferably from 1,500 to 2,200 Oe.

The long axis length of the ferromagnetic metal powder in the magnetic layer is normally from 0.03 to 0.2 μm, preferably from 0.05 to 0.15 μm, more preferably from 0.06 to 0.13 μm. The ratio of long axis length/short axis length of the ferromagnetic metal powder in the magnetic layer is normally from 3 to 10, preferably from 4 to 8. If this ratio exceeds this range, the magnetic layer has a reduced smoothness and hence deteriorated electromagnetic characteristics and durability.

The ferromagnetic metal powder to be used in the present invention may comprise arbitrary elements other than Co and Y incorporated therein. Examples of these elements include Al, Si, S, Sc, Ca, Ti, V, Cr, Cu, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, and B. In the case of magnetic metal powder, Al, Si, Ca, Ba, La, Nd, Ni and B are important. Such the ferromagnetic powder may be treated with a dispersant, lubricant, surface active agent or antistatic agent as described later before dispersion. This is further described in JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-48-39639, and U.S. Pat. Nos. 3,026,215, 3,031,341, 3,100,194, 3,242,005, and 3,389,014.

The foregoing ferromagnetic metal powder may contain a small amount of hydroxide or oxide. In order to prepare such the ferromagnetic metal powder, known preparation methods can be used. These methods include a method which comprises the reduction with a composite organic acid salt (mainly oxalate) and a reducing gas such as hydrogen, a method which comprises the reduction of iron oxide with a reducing gas such as hydrogen to obtain Fe or Fe—Co particles, a method which comprises the pyrolysis of a metallic carbonyl compound, a method which comprises adding a reducing agent such as sodium borohydride, hypophosphite and hydrazine to an aqueous solution of a ferromagnetic metal to reduce the ferromagnetic metal, and a method which comprises the evaporation of a metal in an inert gas under reduced pressure to obtain a finely divided powder. The ferromagnetic alloy powder thus obtained may be subjected to a known gradual-oxidation treatment such as process which comprises dipping the ferromagnetic alloy powder in an organic solvent, and then drying the material, process which comprises dipping the ferromagnetic alloy powder in an organic solvent with an oxygen-containing gas bubbled thereinto to form an oxide film on the surface of the ferromagnetic alloy powder, and then drying the material, and process which comprises controlling the partial pressure of oxygen gas and inert gas instead of using an organic solvent to form an oxide film on the surface of the ferromagnetic alloy powder.

The ferromagnetic metal powder to be incorporated in the magnetic layer of the magnetic recording medium of the present invention may comprise a nonmetallic element such as B, C, Al, Si and P incorporated in its composition to further improve the properties thereof. Particularly preferred among these nonmetallic elements are Al and Si. In general, the foregoing metal powder has an oxide layer formed on the surface thereof to obtain chemical stability.

The water content of the ferromagnetic metal powder is preferably from 0.01 to 2% by weight. The water content of the ferromagnetic metal powder is preferably optimized by selecting the kind of the binder. The pH value of the ferromagnetic metal powder is preferably optimized by properly selecting the binder to be combined therewith. The pH range of the ferromagnetic metal powder is generally from 4 to 12, preferably from 5 to 10.

As the ferromagnetic metal powder to be used in the present invention there may be mainly used the foregoing ferromagnetic metal powder, optionally in combination with ordinary ferromagnetic metal powders other than the foregoing ferromagnetic metal powder.

The content of the binder to be contained in the magnetic layer of the present invention is normally in the range of from 5 to 25% by weight, preferably from 8 to 22% by weight based on the weight of ferromagnetic particles. If a vinyl chloride resin is used, its content is preferably in the range of from 5 to 30% by weight, more preferably from 8 to 20% by weight. If a polyurethane resin is used, its content is preferably in the range of from 2 to 20% by weight, more preferably from 4 to 20% by weight, most preferably from 4 to 8% by weight. If a polyisocyanate is be used, its content is preferably in the range of from 2 to 20% by weight, preferably from 3 to 10% by weight. These binder resins are preferably used in these amounts in combination.

Examples of polyisocyanates which can be used as a hardener in the present invention include isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate, reaction products of these isocyanates with polyalcohols, and polyisocyanates produced by the condensation of isocyanates. Examples of the trade names of these commercially available isocyanates include Coronate L, Coronate HL, Coronate 2030, Coronate 2031, Millionate MR and Millionate MTL (manufactured by Nippon Polyurethane Co., Ltd.), Takenate D-102, Takenate D-101N, Takenate D-200 and Takenate D-202 (manufactured by Takeda Chemical Industries, Ltd.), Desmodur L, Desmodur IL, Desmodur N and Desmodur HL (manufactured by Sumitomo Bayer Co., Ltd.), and Burnok D502 (manufactured by Dainippon Ink & Chemicals, Inc.). These isocyanates may be used singly. Alternatively, by making the best use of the difference in hardening reactivity, two or more of these isocyanates can be used in combination.

The magnetic layer of the present invention may comprise a powder such as carbon black and abrasive incorporated therein.

As carbon black to be incorporated in the present invention there can be used furnace black for rubber, thermal black for rubber, black for color, acetylene black, etc. Such carbon black preferably has a specific surface area of from 5 to 500 m$^2$/g, DBP oil adsorption of from 10 to 400 ml/100 g, average grain diameter of from 5 mµ to 300 mµ, pH value of from 2 to 10, water content of 0.1 to 10%, and tap density (measured under the condition of number of tapping: 150 and head: 30 mm) of 0.1 to 1 g/ml. Specific examples of carbon black to be used in the present invention include BLACKPEARLS 2000, 1300, 1000, 900, 800, 880, 700, VULCAN and XC-72 (produced by Cabot Co., Ltd.), #80, #60, #55, #50, and #35 (produced by Asahi Carbon Co., Ltd.), #2400B, #2300, #5, #900, #950, #970, #1000, #30, #40, and #10B (produced by Mitsubishi Kasei Corporation), CONDUCTEX SC and RAVEN 150, 50, 40 and 15 (produced by Columbia Carbon Co., Ltd.). These carbon blacks may be surface-treated with a dispersant, grafted with a resin or partially graphtized before use. These carbon blacks may be previously dispersed in a binder before being added to the nonmagnetic coating. These carbon blacks may be used singly or in combination. If carbon black is to be used, its content is preferably in the range of from 0.1 to 30% based on the weight of ferromagnetic powder. Carbon black serves to inhibit the electrification of the magnetic layer, reduce the frictional coefficient, provide light screening effect, enhance the film strength, etc. These functions vary with the kind of carbon black used. It goes without saying that these carbon blacks may be optionally different in its kind, content and combination depending on the previously specified properties such as grain size, oil adsorption, electrical conductivity and pH. For carbon blacks which can be incorporated in the upper layer of the present invention, reference can be made to "Handbook of Carbon Black", Carbon Black Kyokai.

Specific examples of abrasives to be used in the present invention include α-alumina having an alpha-conversion of not less than 90%, β-alumina, γ-alumina, silicon carbide, chromium oxide, cerium oxide, α-iron oxide, corundum, artificial diamond, silicon nitride, silicon carbide, titanium carbide, titanium oxide, silicon dioxide, and boron nitride. In general, known materials having a Mohs' hardness of not less than 6 are used singly or in combination. A composite material made of these abrasives (abrasive surface-treated with another abrasive) may be used. These abrasives may contain compounds or elements other than main component but show similar effects so far as the content of the main component is not less than 90%. The grain size of these abrasives is preferably in the range of from 0.01 to 2 µm. If necessary, a plurality of abrasives having different grain sizes may be used in combination or a single abrasive having a wide grain diameter distribution may be used to provide similar effects. The tap density of these abrasives is preferably in the range of from 0.3 to 2 g/ml. The water content of these abrasives is preferably in the range of from 0.1 to 5%. The pH value of these abrasives is preferably in the range of from 2 to 11.

The specific surface area of these abrasives is preferably in the range of from 1 to 30 m$^2$/g. The abrasives to be used in the present invention may be in the form of acicular, spherical or die-like shapes. The abrasives to be used in the present invention may preferably have edges partially on the surface thereof to provide a high abrasive property. Specific examples of abrasives to be used in the present invention include AKP-20, AKP-30, AKP-50, HIT-50, HIT-60, HIT-60A, HIT-70A, HIT-80, HIT-80G, and HIT-100 (manufactured by Sumitomo Chemical Co., Ltd.), G5, G7, and S-1 (manufacture by Nippon Chemical Industrial Co., Ltd.), and TF-100, and TF-140 (manufactured by Toda Kogyo K.K.). The abrasives to be used in the present invention can be varied in the kind, content and combination depending on the purpose. These abrasives may be incorporated in the magnetic coating solution in the form of dispersion in a binder. The amount of the abrasive to be present on the surface and edge of the magnetic layer in the magnetic recording medium of the present invention is preferably in the range of not less than 5 grains/100 μm².

As the additives to be used in the present invention there can be used those having a lubricating effect, an antistatic effect, a dispersing effect, a plasticizing effect, etc. For example, examples of the additives include molybdenum disulfide; tungsten disulfide; graphite; boron nitride; fluorinated graphite; silicone oil; silicone having a polar group; aliphatic acid-modified silicone; fluorine-containing silicone; fluorine-containing alcohol; fluorine-containing ester; polyolefin; polyglycol; alkylphosphoric acid ester and alkali metal salt thereof; alkylsulforic acid ester and alkali metal salt thereof; polyphenyl ether; fluorine-containing alkylsulforic acid ester and alkali metal salt thereof; monobasic aliphatic acid having 10 to 24 carbon atoms (which may contain an unsaturated bond or may be branched) and salt thereof with metals (e.g., Li, Na, K, Cu); monovalent, divalent, trivalent, tetravalent, pentavalent or hexavalent alcohol having 12 to 22 carbon atoms (which may contain an unsaturated bond or may be branched); alkoxy alcohol having 12 to 22 carbon atoms; monoaliphatic acid ester, dialiphatic acid ester or trialiphatic acid ester of monobasic aliphatic acid having 10 to 24 carbon atoms (which may contain an unsaturated bond or may be branched) with one of monovalent, divalent, trivalent, tetravalent, pentavalent and hexavalent alcohols having 2 to 12 carbon atoms (which may contain an unsaturated bond or may be branched); aliphatic acid ester of monoalkyl ether of alkylene oxide polymer, aliphatic amide having 8 to 22 carbon atoms; aliphatic amine having 8 to 22 carbon atoms; etc. can be used.

Specific examples of such the additives include lauric acid, myristic acid, palmitic acid, stearic acid, behenic acid, butyl stearate, oleic acid, linoleic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, and lauryl alcohol. Further, non-ionic surface active agents such as alkylene oxide, glycerin, glycidol and alkylphenolethylene oxide addition product; cationic surface active agents such as cyclic amine, ester amide, quaternary ammonium salt, hydantoin derivative, heterocyclic compound, phosphonium and sulfonium; anionic surface active agents containing acidic groups such as carboxylic acid, sulfonic acid, phosphoric acid, sulfuric acid ester and phosphoric acid ester; amphoteric surface active agents such as amino acid, aminosulfonic acid, sulfuric or phosphoric ester of amino alcohol and alkylbetaine, etc. can be used. These surface active agents are described in "Kaimen Kasseizai Binran (Handbook of Surface Active Agents)", Sangyo Tosho K. K. These lubricants, antistatic agents, etc. may not be necessarily 100% pure but may contain impurities such as isomer, unreacted product, by-product, decomposition product and oxide. The concentration of these impurities is preferably in the range of not more than 30%, more preferably not more than 10%.

These lubricants and surface active agents to be used in the present invention may be varied in their kind and content as necessary. For example, aliphatic acids may be varied in its melting point to control the oozing thereof to the surface. Esters may be varied in its boiling point or polarity to control the oozing thereof to the surface. The content of surface active agents may be controlled to improve the coating stability. It goes without saying that the present invention is not limited to these examples.

The additives to be used in the present invention may be entirely or partially added to the system at any steps during the preparation of the magnetic coating solution. For example, these additives may be mixed with magnetic powders before kneading. Further, these additives may be added to the system at the step of kneading magnetic powders with a binder and a solvent. Alternatively, these additives may be added to the system during or after the dispersion step or immediately before the coating step. Depending on the purpose, additives may be partially or entirely applied by the simultaneous or successive coating method after the application of the magnetic layer. Further, a lubricant may be applied to the surface of the magnetic layer after calendering or slitting depending on the purpose.

Examples of the trade name of these lubricants to be used in the present invention include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, castor oil hardened aliphatic acid, NAA-42, NAA-44, Cation SA, Cation MA, Cation AB, Cation BB, Nymeen L-201, Nymeen L-202, Nymeen S-202, Non-ion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monoguri MB, Nonion DS-60, Anon BF, Anon LG, butyl stearate, butyl laurate, and erucic acid (manufactured by Nippon Oils And Fats Co., Ltd.), oleic acid (manufactured by Kanto Chemical Co., Ltd.), FAL-205 and FAL-123 (manufactured by Takemoto Yushi K.K.), Enujerubu LO, Enujerubu IPM and Sansosyzer E4030 (manufactured by Shin Nihon Rika K.K.), TA-3, KF-96, KF-96L, KF-96H, KF-410, KF-420, KF-965, KF-54, KF-50, KF-56, KF-907, KF-851, X-22-819, X-22-822, KF-905, KF-700, KF-393, KF-857, KF-860, KF-865, X-22-980, KF-101, KF-102, KF-103, X-22-3710, X-22-3715, KF-910, and KF-3935 (manufactured by Shin-Etsu Chemical Co., Ltd.), Armide P, Armide C, and Armoslip CP (manufactured by Lion Armor Co., Ltd.), Duomine TDO (manufactured by Lion Fat and Oil Co., Ltd.), BA-41G (manufactured by Nisshin Oil Mills, Co., Ltd.), and Profan 2012E, New Pole PE61, Ionet MS-400, Ionet MO-200, Ionet DL-200, Ionet DS-300, Ionet DS-1000, and Ionet DO-200 (manufactured by Sanyo Chemical Co., Ltd.).

Examples of organic solvents which can be used in the present invention include ketones such as acetone, methyl ethyl ketone, methyl isobutyl ketone, diisobutyl ketone, cyclohexanone, isophorone and tetrahydrofuran; alcohols such as methanol, ethanol, propanol, butanol, isobutyl alcohol, isopropyl alcohol and methyl cyclohexanol; esters such as methyl acetate, butyl acetate, isobutyl acetate, isopropyl acetate, ethyl butyrate and glycol acetate; glycol ethers such as glycol dimethyl ether, glycol monoethyl ether and dioxane; aromatic hydrocarbons such as benzene, toluene, xylene, cresol and chlorobenzene; chlorinated hydrocarbons such as methylene chloride, ethylene chloride, carbon tetrachloride, chloroform, ethylene chlorohydrin and dichlorobenzene, N,N-dimethylformamide, and hexane. These organic solvents may be used in any proportions. These organic solvents are not necessarily 100% pure and may contain impurities such as isomers, unreacted products, by-products, decomposition products, oxides and water content besides main components. The content of these impurities is preferably in the range of not more than 30%, more preferably not more than 10%. In order to enhance the dispersibility, the polarity of the organic solvent is preferably somewhat high. The solvents to be used for these layers preferably contain a solvent having a dielectric constant of from 15 to 20 in an amount of not less than 50%. The solubility parameter of these solvents is preferably in the range of from 8 to 11.

In the thickness of the magnetic recording medium of the present invention, the thickness of the non-magnetic support is in the range of generally from 1 to 100 μm, preferably from 4 to 12 μm, the thickness of the magnetic layer is normally from 0.1 to 5 μm, preferably from 1 to 3 μm, the thickness of the backing layer is normally from 0.1 to 2 μm, preferably from 0.4 to 1 μm and the adhesive layer for improving the adhesivity between the non-magnetic support and the magnetic layer is normally from 0.01 to 2 μm, preferably from 0.02 to 0.5 μm. As these adhesive and back coating layers there can be used known materials.

The non-magnetic support to be used in the present invention has a micro Vickers' hardness of not less than 75 kg/mm$^2$. As such a non-magnetic support there can be used any known film such as biaxially-oriented polyethylene naphthalate (PEN), polyamide, polyimide, polyamideimide, aromatic polyamide and polybenzoxidazole. In particular, a non-magnetic support comprising an alamide resin or polyethylene naphthalate is preferred.

These support materials may be previously subjected to corona discharge, plasma treatment, easy adhesion treatment, heat treatment, dust-resistant treatment, etc. In order to accomplish the objects of the present invention, it is necessary to use a non-magnetic support having a center-line average (surface) roughness (defined by JIS B0601) of generally 0.1 nm to 10 nm, preferably 0.2 nm to 6 nm, more preferably 0.5 nm to 4 nm on the magnetic layer side. Such the non-magnetic support preferably not only has a small center-line average (surface) roughness but also has no big protrusions having a size of 1 μm or more. The shape of the surface roughness may be freely controlled by the size and amount of filler to be incorporated in the support as necessary. Examples of the filler include oxide and carbonate of Al, Ca, Si, and Ti, regardless of whether it is crystalline or amorphous, and finely divided organic powder such as acryl and melamine. In order to meet the requirements both for surface roughness and running durability, it is preferred that the roughness of the non-magnetic support on the backcoating layer side be greater than that on the magnetic layer side. The center-line average (surface) roughness of the non-magnetic support on the backcoating layer side is preferably not less than 1 nm, more preferably not less than 4 nm. In the case where the roughness on the magnetic layer side is different from that on the backcoating layer side, a support having a dual structure may be used. Alternatively, a coating layer may be provided to provide different surface roughnesses.

The non-magnetic support to be used in the present invention preferably exhibits F-5 values of from 10 to 50 kg/mm$^2$ in the tape-running direction and from 10 to 30 kg/mm$^2$ in the tape-width direction. In general, F-5 value in the tape-running direction is higher than F-5 value in the tape-width direction. However, if the strength in the tape-width direction of the nonmagnetic support needs to be high, the present invention is not limited to this specification. The non-magnetic support preferably exhibits a heat shrinkage in the tape-width and running direction of not more than 3%, more preferably not more than 1.5% at 100° C. for 30 minutes and not more than 1%, more preferably not more than 0.5% at 80° C. for 30 minutes. The breaking strength of the support is preferably in the range of from 5 to 100 kg/mm$^2$ in both directions. The elastic modulus of the support is preferably in the range of from 100 to 2,000 kg/mm$^2$ in both directions. In the present invention, the light transmittance at a wavelength of 900 nm is preferably not more than 30%, more preferably not more than 3%.

The process for the preparation of the magnetic coating solution for the magnetic layer in the magnetic recording medium of the present invention comprises at least kneading step, dispersion step, and mixing step which is optionally provided before or after these steps. These steps each may consist of two or more stages. The raw materials to be used in the present invention, e.g., ferromagnetic powders, binder resin, carbon black, abrasive, antistatic agent, lubricant and solvent may be added to the system at the beginning or during any step. These raw materials each may be batchwise added to the system at two or more steps. For example, polyurethane may be batchwise charged in the system at the kneading step, dispersion step or a mixing step for the viscosity adjustment after dispersion. In order to accomplish the objects of the present invention, a known preparation technique can, of course, be used as a step. In the kneading step, an apparatus having a strong kneading power such as continuous kneader and pressure kneader can be used. If a continuous kneader or pressure kneader is used, the magnetic powders are kneaded with the whole or part (preferably 30% by weight or more of the total weight of all binder resins) of the binder in an amount of from 15 to 500 parts by weight based on 100 parts by weight of magnetic powders. These kneading techniques are further described in JP-A-1-106388 and JP-A-64-79274.

In order to obtain a magnetic recording medium according to the present invention, a strong orientation needs to be effected. A solenoid having 1,000 G or more and a cobalt magnet having 2,000 G or more are preferably used in combination in such an arrangement that the same pole of the two magnets are countered to each other. Further, a proper drying process is preferably provided before the orientation step to maximize the orientability after drying. It has been known that a high density recording can be effectively accomplished by inclining the easy magnetization axis to the vertical direction regardless of whether the grain is acicular or tabular. This method can be used in combination.

Known methods are preferably used additionally to enhance the adhesivity. For example, an adhesive layer mainly composed of a polymer may be provided prior to the application of magnetic layer. Alternatively, the non-magnetic support may be subjected to corona discharge, irradiation with UV or irradiation with EB.

As calendering roll there can be used a roll made of a heat-resistant plastic such as epoxy, polyimide, polyamide and polyimideamide. Only metallic rolls may be used in combination. The processing temperature is preferably in the range of 70° C. to 120° C., more preferably 80° C. to 100° C. The linear pressure is preferably in the range of from 200 to 500 kg/cm, more preferably 300 to 400 kg/cm.

The magnetic recording medium of the present invention preferably exhibits a frictional coefficient of from 0.1 to 0.5, more preferably from 0.2 to 0.3 against SUS420J on the magnetic layer side and the other side. The magnetic layer preferably has an inherent surface resistivity of from $10^4$ to $10^{12}$ Ω/sq. The magnetic layer preferably exhibits an elastic modulus of from 100 to 2,000 kg/mm$^2$ at 0.5% elongation in both running-direction and width-direction. The breaking strength of the magnetic layer is preferably in the range of from 1 to 30 kg/cm$^2$. The elastic modulus of the magnetic recording medium is preferably in the range of from 100 to 1,500 kg/mm$^2$ in both running-direction and width-direction. The residual elongation of the magnetic recording medium is preferably in the range of not more than 0.5%. The heat shrinkage of the magnetic recording medium at all temperatures of 100° C. or less is preferably not more than 1%, more preferably not more than 0.5%, most preferably not more than 0.1% (ideally 0%). The glass transition temperature (maxima of loss modulus of dynamic viscoelasticity measured at 110 Hz) of the magnetic layer is preferably from 50° C. to 120° C. The loss modulus of the magnetic layer is preferably in the range of from $1\times10^8$ to $8\times10^9$ dyne/$cm^2$. The loss tangent of the magnetic layer is preferably in the range of not more than 0.2. If the loss tangent of the magnetic layer is too great, it can easily suffer from faulty due to adhesion. The amount of the residual solvent to be contained in the magnetic layer is preferably in the range of not more than 100 mg/$m^2$, more preferably not more than 10 mg/$m^2$. The magnetic layer preferably has voids of not more than 30 vol %, more preferably not more than 20 vol %. The voids are preferably small to provide a high output. In some cases, certain voids are preferably secured depending on the purpose. For example, in the case of magnetic recording media for data recording, repeated use of which is particularly needed, the voids are preferably great to provide excellent running durability.

In the magnetic characteristics of the magnetic recording medium of the present invention measured by means of VSM under a magnetic field of 10 KOe, Hc in the tape running direction is preferably from 2,000 to 3,000 Oe, more preferably from 2,100 to 2,500 Oe. The squareness ratio is preferably in the range of not less than 0.75, more preferably not less than 0.80, most preferably not less than 0.85 in the tape-running direction. The squareness ratio in two directions perpendicular to the tape-running direction is preferably in the range of not more than 80% of that in the tape running direction. SFD (Switching Field Distribution) of the magnetic layer is preferably in the range of not more than 0.6, more preferably not more than 0.5, ideally 0. The remanent coercive force Hr in the longitudinal (tape-running) direction is preferably from 1,800 Oe to 3,000 Oe. Hc and Hr in the vertical (tape-width) direction are each preferably from 1,000 Oe to 5,000 Oe.

The center-line average (surface) roughness Ra of the magnetic layer is preferably in the range of from 1 nm to 10 nm but should be properly adjusted depending on the purpose. The smaller Ra is, the better are the electromagnetic characteristics. On the contrary, the larger Ra is, the better is the running durability. The RMS (Root Mean Square) surface roughness (RRMS) of the magnetic layer determined by AFM evaluation is preferably in the range of from 2 nm to 15 nm.

The magnetic recording medium of the present invention comprises at least one magnetic layer. The magnetic layer may be in the form of a plurality of layers depending on the purpose. Further, a non-magnetic layer comprising at least a non-magnetic powder and a binder may be provided between the magnetic layer and the non-magnetic support. It can easily be presumed that the physical properties of the magnetic recording medium may be altered from one layer to another. For example, the elastic modulus of the magnetic layer can be enhanced to improve the running durability thereof while the elastic modulus of the non-magnetic layer can be lower than that of the magnetic layer to improve the contact of the magnetic recording medium with the head. Further, the method for raising the tensility of the support may be used to improve the head contact in the present invention. A support the tensility of which has been raised in the direction perpendicular to the longitudinal direction of the tape (i.e., tape-running direction) can often exhibit a good head contact.

The present invention will be further described in the following examples and comparative examples, but the present invention should not be construed as being limited thereto. The term "parts" as used herein is meant to indicate "parts by weight".

EXAMPLE (Example 1-1)
Composition of magnetic layer
100 parts of a ferromagnetic metal powder A (as shown in Table 1) were ground by an open kneader for 10 minutes. To the powder thus kneaded were then added the following components:

| | |
|---|---|
| Vinyl chloride resin ("MR-110"; manufactured by Nippon Zeon Co., Ltd.) | 8 parts |
| Polyurethane A (set shown in Table 2) | 6 parts (solid content) |
| MEK | 40 parts |

The mixture was then kneaded for 60 minutes.
To the mixture thus kneaded were then added the following components:

| | |
|---|---|
| Abrasive ($Al_2O_3$; grain size: 0.2 μm) | 2 parts |
| Carbon black (grain size: 40 nm) | 2 parts |
| 1/1-Mixture of methyl ethyl ketone and cyclohexanone | 200 parts |

The mixture was then subjected to dispersion by means of a sand mill for 120 minutes. To the dispersion were then added the following components:

| | |
|---|---|
| Polyisocyanate ("Coronate 3041", manufactured by Nippon Polyurethane Co., Ltd.) | 4 parts (solid content) |
| Stearic acid | 1 part |
| sec-Butyl stearate | 1 part |
| Amide stearate | 1 part |
| Methyl ethyl ketone | 50 parts |

The mixture was stirred for 20 minutes, and then filtered through a filter having an average pore diameter of 1 μm to prepare a magnetic coating solution. The magnetic coating thus obtained was then applied to the surface of a 7-μm thick PEN support to obtain a dry thickness of 2 μm by means of a reverse roll. The following backcoating solution was then applied to the support to obtain a thickness of 0.5 μm, followed by drying. The non-magnetic support on which the magnetic support had been coated was then oriented in a magnetic field produced by a 3,000 G magnet while it was wet. After drying, the coated support was subjected to 5-stage calendering by a combination of one metallic roll with another (speed: 100 m/min; linear pressure: 300 kg/cm; temperature: 90° C.), and then slit into a ½ inch wide web at a rate of 200 m/min to prepare a video tape adapted for high-fidelity television.
(Composition of backcoating solution)

| | |
|---|---|
| Carbon black (grain diameter: 18 nm) | 100 parts |
| Nitrocellulose ("RS1/2H", manufactured by Daicel Chemical Industries, Ltd.) | 60 parts |
| Polyurethane ("N-2301", manufactured by Nippon Polyurethane Co., Ltd.) | 60 parts |
| Polyisocyanate ("Coronate L", manufactured by Nippon Polyurethane Co., Ltd.) | 20 parts |
| Methyl ethyl ketone | 1,000 parts |
| Toluene | 1,000 parts |

The details of the ferromagnetic metal powder are shown in Table 1, and the details of the polyurethane are shown in Tables 2 and 3.

TABLE 1

| Kind of ferromagnetic metal powder | Remarks | Composition (atm-%) | | | | Magnetic properties | |
|---|---|---|---|---|---|---|---|
| | | Fe | Co[*1] | Y[*2] | Others[*3] | Hc (Oe) | σs (emu/g) |
| A | Example | 100 | 22.4 | 1.8 | 15.2 | 1,780 | 142 |
| B | Example | 100 | 14.0 | 1.5 | 7.6 | 1,620 | 126 |
| C | Example | 100 | 15.4 | 2.4 | 13.0 | 1,900 | 148 |
| D | Example | 100 | 35.0 | 3.9 | 12.8 | 2,100 | 133 |
| E | Example | 100 | 21.8 | 4.8 | 13.8 | 2,260 | 140 |
| F | Example | 100 | 31.0 | 3.4 | 8.0 | 2,120 | 156 |
| G | Comparative Example | 100 | 21.8 | 0 | 14.8 | 1,770 | 141 |
| H | Comparative Example | 100 | 22.8 | 5.4 | 15.2 | 1,800 | 143 |
| I | Comparative Example | 100 | 31.6 | 0.5 | 10.2 | 2,100 | 146 |

[*1]: Co/Fe
[*2]: Y/(Fe + Co)
[*3]: Others/Fe

TABLE 2

| | A Present Invention | B Present Invention | C Comparative Example | D Comparative Example |
|---|---|---|---|---|
| Polyurethane composition | | | | |
| Polyether polyol | | | | |
| Composition (molar ratio) | PPG | PTMG | — | PPG |
| Molecular weight | 2,000 | 2,000 | — | 2,000 |
| Tg (°C.) | −75 | −84 | — | −75 |
| mol | 0.023 | 0.023 | — | 0.046 |
| Polyester polyol | | | | |
| Composition (molar ratio) | iPA/NPG/EG = 5/5/0.1 | iPA/NPG/CHM = 4.9/4/1.1 | iPA/NPG/PCL = 1/1/8 | — |
| Molecular weight | 2,000 | 2,000 | 2,000 | — |
| Tg (°C.) | 55 | 62 | 8 | — |
| mol | 0.023 | 0.023 | 0.046 | — |
| Chain extender (mol) | NPG 0.06 | BG 0.06 | NPG 0.06 | NPG 0.06 |
| DEIS (mol) | 0.009 | 0.009 | 0.009 | 0.009 |
| Diisocyanate (mol) | MDI 0.1 | XDI 0.1 | MDI 0.1 | MDI 0.1 |
| Weight-average molecular weight (× 10,000) | 3.5 | 5.8 | 5.8 | 3.5 |
| Tg (°C.) of polyurethane | 62, −17 | 62, −25 | 32 | −48 |

TABLE 3

| | E Comparative Example | F Comparative Example | G Present Invention | H COMPARATIVE EXAMPLE |
|---|---|---|---|---|
| Polyurethane composition | | | | |
| Polyether polyol | | | | |
| Composition (molar ratio) | — | PPG/NPG/MDI = 1/2/2.9 | PTMG | BPA-EO/PTMG = 1/3 |
| Molecular weight | — | 2,000 | 2,000 | 2,000 |
| Tg (°C.) | — | −40 | −84 | 10 |
| mol | — | 0.023 | 0.023 | 0.023 |
| Polyester polyol | | | | |
| Composition (molar ratio) | PTMG/BPA-EO/iPA = 7/3/3.2 | PLC/NPG/MDI = 1/4/4.8 | NPG/Ad/iPA = 2/1/1 | iPA/NPG/EG = 5/5/0.1 |
| Molecular weight | 2,000 | 2,000 | 2,000 | 2,000 |
| Tg (°C.) | 35 | 20 | 30 | 55 |
| mol | 0.046 | 0.023 | 0.023 | 0.023 |
| Chain extender (mol) | NPG 0.06 | BG 0.06 | NPG 0.06 | NPG 0.06 |
| DEIS (mol) | 0.009 | 0.009 | 0.009 | 0.009 |
| Diisocyanate (mol) | MDI 0.1 | XDI 0.1 | MDI 0.1 | MDI 0.1 |
| Weight-average molecular weight (× 10,000) | 5.3 | 1.95 | 7.1 | 6.3 |
| Tg (°C.) of polyurethane | 61 | −6 | 40, −25 | 60, 15 |

The abbreviations in the above tables have the following meaning:

| | |
|---|---|
| Ad: | Adipic acid |
| DEIS: | Ethylene oxide adduct of sulfoisophthalic acid represented by the following formula: |

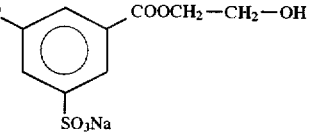

In order to determine Tg of the polyurethane of the present invention, the binder resin film having a thickness of 20 μm was formed. The peak of E" of the film was measured by Vibron (manufactured by Orientec Co., Ltd.) to determine Tg thereof.

Examples 1-2 To 1-4; Comparative Examples 1-1 To 1-4

The same procedure of Example 1-1 was carried out except that the materials shown in Table 4 were used to prepare various video tapes.

Example 2-1

Composition of magnetic layer 100 parts of a ferromagnetic metal powder A (as shown in Table 1) were ground by an open kneader for 10 minutes. To the powder thus kneaded were then added the following components:

| | |
|---|---|
| Vinyl chloride resin | 8 parts |
| Vinyl chloride resin ("MR-110"; manufactured by Nippon Zeon Co., Ltd.) | 8 parts |
| Polyurethane A (shown in Table 2) | 6 parts (solid content) |
| MEK | 40 parts |

The mixture was then kneaded for 60 minutes.

To the mixture thus kneaded were then added the following components:

| | |
|---|---|
| Abrasive ($Al_2O_3$; grain size: 0.2 μm) | 2 parts |
| Carbon black (grain size: 40 nm) | 2 parts |
| 1/1-Mixture of methyl ethyl ketone and cyclohexanone | 200 parts |

The mixture was then subjected to dispersion by means of a sand mill for 120 minutes. To the dispersion were then added the following components:

| | |
|---|---|
| Polyisocyanate ("Coronate 3041", manufactured by Nippon Polyurethane Co., Ltd.) | 4 parts (solid content) |
| Stearic acid | 1 part |
| sec-Butyl stearate | 1 part |
| Amide stearate | 1 part |
| Methyl ethyl ketone | 50 parts |

The mixture was then processed in the same manner as in Example 1-1 to prepare a video tape adapted for high-fidelity television.

Examples 2-2 To 2-6; Comparative Examples 2-1 To 2-3

The same procedure of Example 2-1 was carried out except that the materials shown in Table 5 were used to prepare various video tapes.

The results of the evaluation of the above video tapes are shown in Tables 4 and 5.

TABLE 4

| Example No. | Ferromagnetic metal powder | Polyurethane | Reproduced output (dB) | Scratching property | Head stain | Head abrasion (μm) |
|---|---|---|---|---|---|---|
| Example 1-1 | A | A | +2 | 0 | A | 1.5 |
| Example 1-2 | A | B | +1.9 | 0.001 | A | 1.5 |
| Example 1-3 | A | G | +2.2 | 0.01 | B | 1.1 |
| Example 1-4 | A | H | +1.5 | 0 | A | 1.7 |
| Comparative Example 1-1 | A | C | +1.0 | 0.02 | C | 1.6 |
| Comparative Example 1-2 | A | D | +2.4 | 0.05 | D | 1.0 |
| Comparative Example 1-3 | A | E | +0.5 | 0.015 | C | 2.2 |
| Comparative Example 1-4 | A | F | +2.0 | 0.04 | D | 1.2 |

TABLE 5

| Example No. | Ferromagnetic metal powder | Polyurethane | Reproduced output (dB) | Scratching property | Head stain | Head abrasion (μm) |
|---|---|---|---|---|---|---|
| Example 2-1 | A | A | +2 | 0 | A | 1.5 |
| Example 2-2 | B | A | 0 | 0 | A | 1.6 |
| Example 2-3 | C | A | +2.5 | 0.005 | A | 1.2 |
| Example 2-4 | D | A | +3.0 | 0.01 | B | 1.0 |
| Example 2-5 | E | A | +3.2 | 0.011 | B | 0.8 |

TABLE 5-continued

| Example No. | Ferromagnetic metal powder | Polyurethane | Reproduced output (dB) | Scratching property | Head stain | Head abrasion (μm) |
|---|---|---|---|---|---|---|
| Example 2-6 | F | A | +1.8 | 0.008 | A | 1.1 |
| Comparative Example 2-1 | G | A | +1.9 | 0 | A | 3.0 |
| Comparative Example 2-2 | H | A | +2.0 | 0.02 | C | 0.3 |
| Comparative Example 2-3 | I | A | +2.8 | 0.001 | A | 2.8 |

[Evaluation method]
Electromagnetic characteristics (initial output CN)
<Reproduced output>

D3 VTR D350 (PAL) (tape speed relative to magnetic head: 23.9 m/sec) (manufactured by Matsushita Electric Industrial Co., Ltd.) was used to record 33.5 MHz signal on the magnetic recording medium. The signal thus recorded was then reproduced. The reproduced output was measured by a spectral analyzer relative to the output of a reference tape (Example 2-2) as 0 dB.

<Scratching property>

A tape having a length of 30 m was subjected to a 100-pass play-rewinding test in D3 VTR D350 (manufactured by Matsushita Electric Industrial Co., Ltd.) in the atmosphere of 23° C. and 10% RH. The change of the intensity ratio of chlorine atom to iron atom (Cl/Fe) on the surface of the magnetic layer by ESCA from before to after running was determined to evaluate scratching property.

<Head stain>

A tape having a length of 30 m was subjected to a 100-pass play-rewinding test in D3 VTR D350 (manufactured by Matsushita Electric Industrial Co., Ltd.) in the atmosphere of 23° C. and 10% RH. After running, the condition of head stain was evaluated in accordance with the following criterion:

A: No stain observed; B: Slight stain observed; C: Stain observed; D: Stain observed in head gap zone <Head abrasion>

A tape having a length of 600 m was allowed to run back and forth on the magnetic head. Eight such tapes were continuously allowed to run on the magnetic head. The head height was measured before and after running to determine the abrasion.

The foregoing tables show that the magnetic recording media comprising the binder and ferromagnetic metal powder of the present invention are excellent all in the various properties evaluated while the magnetic recording media of the comparative examples are poor in any of these properties. Therefore, it is demonstrated that the examples of the present invention are superior to the comparative examples.

[Effect of the invention]

The present invention employs a combination of a polyurethane having a specific structure and a ferromagnetic metal powder having a specific structure to provide a high dispersibility, a high smoothness and high magnetic characteristics. Further, the present invention can provide a magnetic recording medium for high-fidelity television which exhibits excellent electromagnetic characteristics, excellent repeated running properties, shows little scratching of magnetic layer, causes reduced head abrasion and gives a high output.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a magnetic layer comprising a ferromagnetic powder and a binder provided on one side of a non-magnetic support and a backing layer provided on another side of said non-magnetic support, wherein said ferromagnetic powder is a ferromagnetic metal powder comprising Fe as a main component and Co and containing Y in an amount of from 1 to 5 atom-% based on the total of Fe and Co in said ferromagnetic metal powder, and said binder comprises a polyurethane mainly comprising a diol component comprising a polyether polyol and a polyester polyol and a polyisocyanate component; wherein said polyurethane has a first glass transition temperature within the range from −200° C. to −5° C. and a second glass transition temperature within the range from 40° C. to 130° C.

2. The magnetic recording medium as claimed in claim 1, wherein said polyurethane comprises a polyurethane containing at least one polar group selected from the group consisting of —$SO_3M$, —$OSO_3M$, —$COOM$, —$PO_3M_2$, —$OPO_3M_2$, —$NR_2$, —$N^+R_3X^-$, —$N^+R_2R^1SO_3^-$ and —$N^+R_2R^1COO^-$ (wherein M represents a hydrogen atom, an alkaline metal ion selected from $Li^+$, $K^+$ and $Na^+$ or an ammonium ion; R and $R^1$ each represent an alkyl group having 1 to 12 carbon atoms; and X represents a halogen atom) in an amount of from $1\times10^{-6}$ to $1\times10^{-3}$ eq/g.

3. The magnetic recording medium as claimed in claim 1, wherein said ferromagnetic metal powder contains Co in an amount of from 5 to 40 atom-% based on Fe.

4. The magnetic recording medium as claimed in claim 1, wherein said polyurethane is contained in said binder in an amount of from 10 to 90% by weight based on the binder.

5. The magnetic recording medium as claimed in claim 1, wherein said polyether polyol is contained in said polyurethane in a proportion of from 3 to 80% by weight.

6. The magnetic recording medium as claimed in claim 1, wherein said polyester polyol is contained in said polyurethane in a proportion of from 5 to 92% by weight.

7. The magnetic recording medium as claimed in claim 1, wherein said ferromagnetic metal powder contains Co in an amount from 10 to 30 atom-% based on Fe.

8. The magnetic recording medium as claimed in claim 7, wherein said ferromagnetic metal powder contains Y in an amount from 1.4 to 4.0 atom-% based on the total amount of the Fe and Co.

9. The magnetic recording medium as claimed in claim 1, wherein said ferromagnetic metal powder has a coercive force from 1,500 to 2,200 Oe.

10. The magnetic recording medium as claimed in claim 8, wherein said ferromagnetic metal powder has a long axis length from 0.06 to 0.13 and has a ratio of long axis length/short axis length from 4 to 8.

11. The magnetic recording medium as claimed in claim 1, wherein said ferromagnetic metal powder has a crystallite size from 120 to 220 Å.

12. The magnetic recording medium as claimed in claim 8, wherein said ferromagnetic metal powder has a saturation magnetization (σ s) from 120 to 180 emu/g.

13. The magnetic recording medium as claimed in claim 3, wherein said polyurethane comprises a polyurethane containing at least one polar group selected from the group consisting of $SO_3M$, $PO_3M_2$ and COOM (wherein M represents a hydrogen atom, Li ion, K ion, Na ion or ammonium ion) in an amount from $1 \times 10^{-5}$ to $5 \times 10^{-4}$ eq/g.

14. The magnetic recording medium as claimed in claim 8, wherein said first glass transition temperature is within the range from −200° C. to 10° C., and said second glass transition temperature is within the range from 45° C. to 110° C.

15. The magnetic recording medium as claimed in claim 8, wherein said polyether polyol in said polyurethane is polypropylene glycol, polytetramethylene glycol or a mixture thereof.

16. The magnetic recording medium as claimed in claim 8, wherein said polyether polyol in said polyurethane has a molecular weight from 800 to 3,000.

17. The magnetic recording medium as claimed in claim 8, wherein a proportion of said polyether polyol in said polyurethane is from 10 to 50% by weight.

18. The magnetic recording medium as claimed in claim 8, wherein said polyester polyol in said polyurethane has a cyclic structure derived from isophthalic acid or terephthalic acid and a branched structure derived from neopentyl glycol, cyclohexanedimethanol, cyclohexanediol, bisphenol A or hydrogenated bisphenol A.

19. The magnetic recording medium as claimed in claim 18, wherein said polyester polyol in said polyurethane has a molecular weight from 800 to 3,000.

20. The magnetic recording medium as claimed in claim 8, wherein a proportion of said polyester polyol in said polyurethane is from 20 to 70% by weight.

21. The magnetic recording medium as claimed in claim 8, wherein said polyurethane has a weight-average molecular weight from 20,000 to 200,000.

22. The magnetic recording medium as claimed in claim 21, wherein said polyurethane has a yield stress from 2.8 to 8 kg/mm², an elongation at break from 200 to 800%, and breaking stress from 2 to 10 kg/cm².

23. The magnetic recording medium as claimed in claim 8, wherein said binder further comprises a vinyl chloride resin in which a weight proportion of vinyl chloride monomer is from 80 to 95% by weight.

24. The magnetic recording medium as claimed in claim 8, wherein said binder contains said polyurethane in an amount from 20 to 70% by weight based on the weight of said binder.

25. The magnetic recording medium as claimed in claim 1, wherein said magnetic layer contains said binder in an amount from 5 to 25% by weight based on a weight of said ferromagnetic powder.

26. The magnetic recording medium as claimed in claim 1, wherein said magnetic layer further comprises carbon black and abrasives.

27. The magnetic recording medium as claimed in claim 1, wherein said support has a thickness from 4 to 12 μm, said magnetic layer has a thickness from 1 to 3 μm, and said backing layer has a thickness from 0.4 to 1 μm.

28. The magnetic recording medium as claimed in claim 8, wherein said first transition temperature is within the range of from −10° C. to −40° C., and said second transition temperature is within the range of from 60° C. to 100° C.

29. A magnetic recording medium which comprises a support having on one side thereof a magnetic layer comprising a ferromagnetic metal powder dispersed in a binder and having another side thereof a backing layer, wherein said ferromagnetic metal powder comprises Fe as a main component, Co in an amount from 5 to 40 atom-% base on Fe and Y in an amount from 1 to 5 atom-% based on a total of Fe and Co in said ferromagnetic metal powder, and said binder comprises a polyurethane which is a reaction product of a polyether polyol having a molecular weight from 500 to 5,000, polyester polyol having a molecular weight from 500 to 5,000 and a polyisocyanate, in which a moiety derived from said polyether polyol is contained in a block pattern in said polyurethane.

* * * * *